June 24, 1924.

L. KATZMAN 1,499,220

SELF INSTRUCTING DRESSMAKER'S OUTFIT

Filed Aug. 18, 1923    3 Sheets-Sheet 1

WITNESSES

Frederick Diehl.

A. L. Kitchen.

INVENTOR
LOUIS KATZMAN

BY

ATTORNEYS

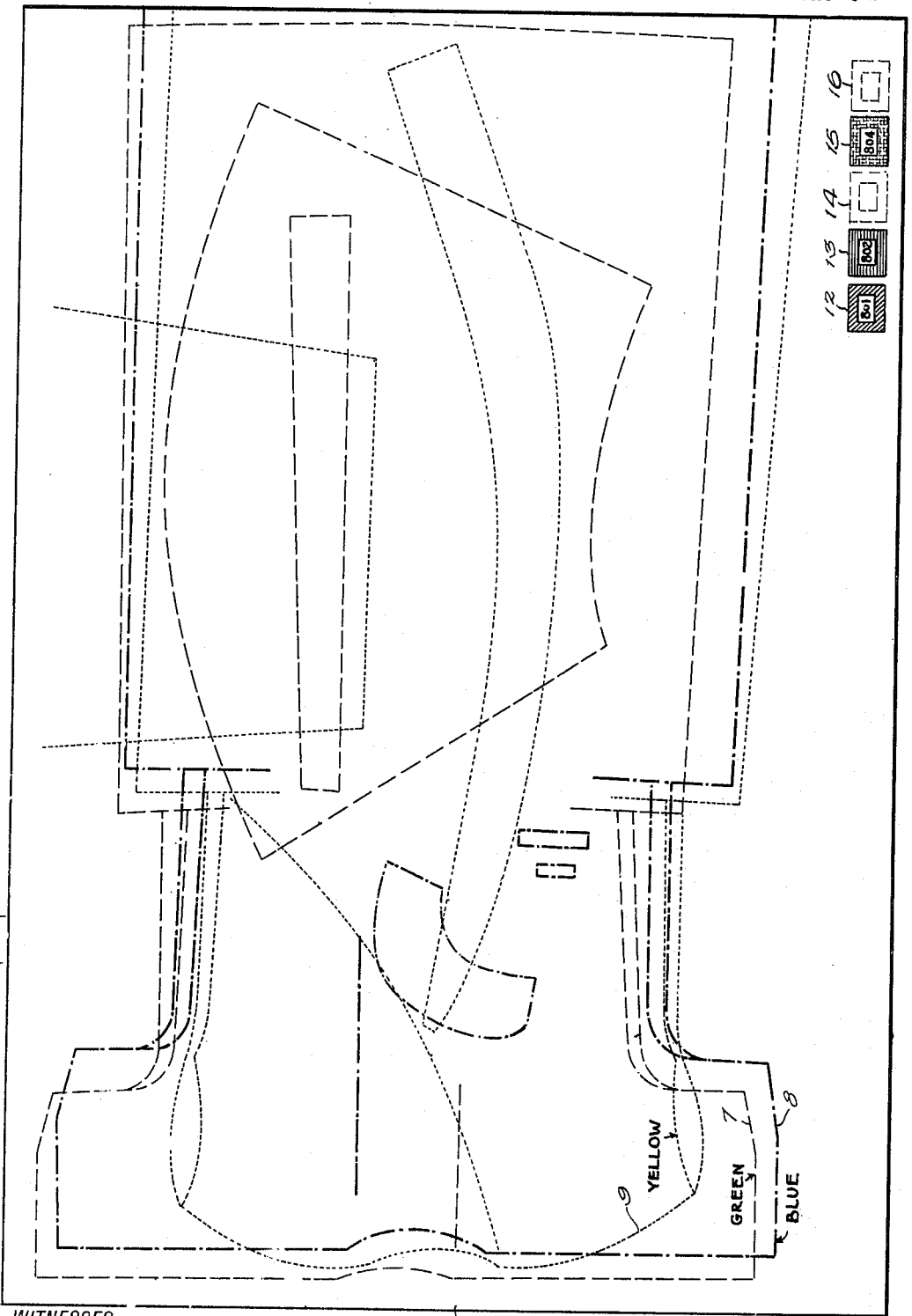

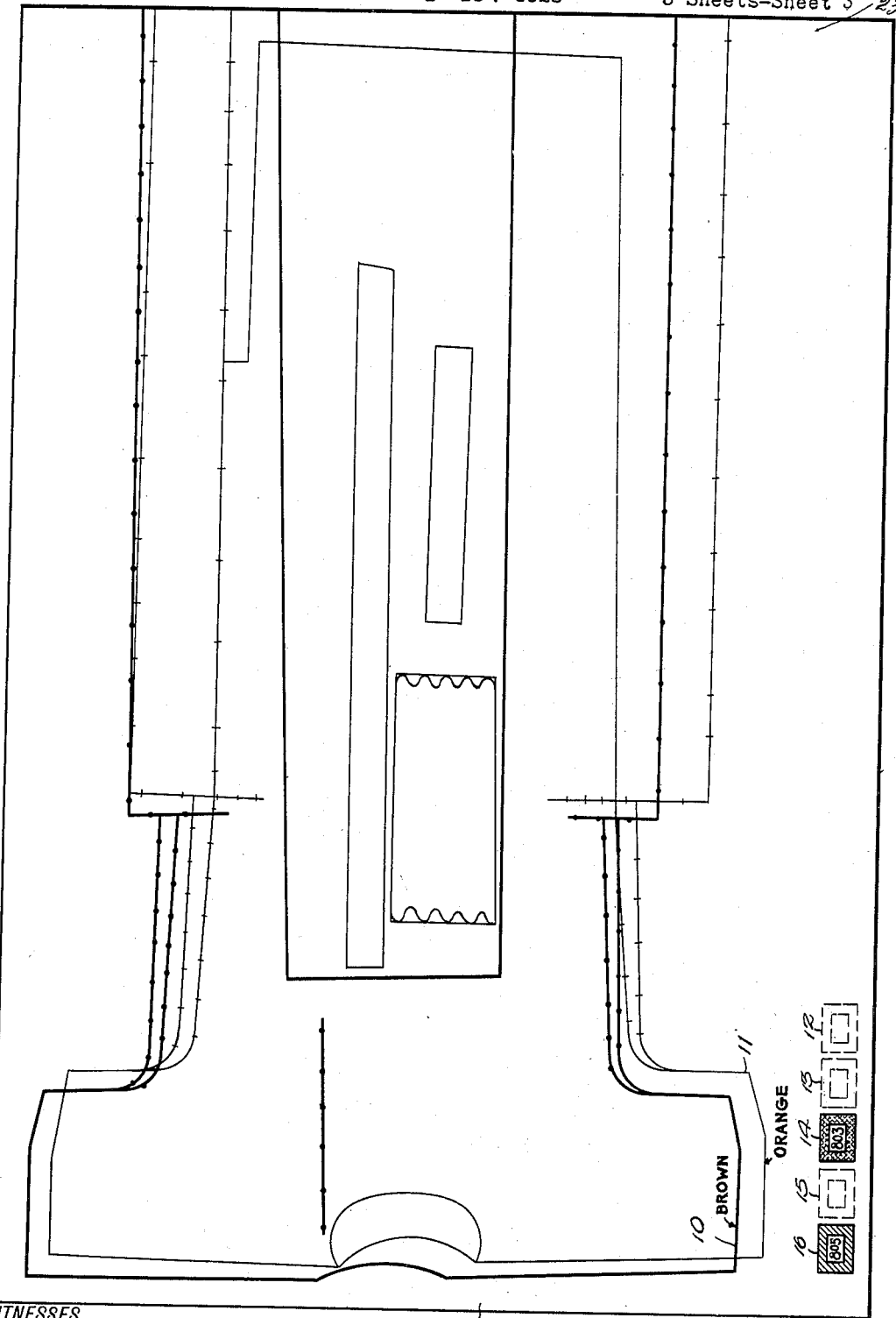

Patented June 24, 1924.

1,499,220

UNITED STATES PATENT OFFICE.

LOUIS KATZMAN, OF NEW YORK, N. Y.

SELF-INSTRUCTING DRESSMAKER'S OUTFIT.

Application filed August 18, 1923. Serial No. 658,068.

*To all whom it may concern:*

Be it known that I, LOUIS KATZMAN, a citizen of the United States, and a resident of the city of New York, borough of Manhattan, in the county and State of New York, have invented a new and Improved Self-Instructing Dressmaker's Outfit, of which the following is a full, clear, and exact description.

This invention relates to educational appliances and particularly to an improved chart or outfit for instructing dressmakers in the cutting and constructing of dresses according to different patterns.

The object of the invention is to provide a simplified outfit in the form of an instruction chart wherein a given quantity of goods, a sheet of outlined patterns are presented, together with indications showing the appearance of the finished dress when formed according to any of the patterns.

Another object of the invention is to provide a complete chart structure with interdepending pattern outlines and pictures arranged to guide a more or less inexperienced person in correctly cutting and fitting a garment.

In the accompanying drawing—

Figure 2 is a plan view of a pattern sheet, embodying certain features of the invention.

Figure 3 is a rear view of the sheet shown in Figure 2.

Figure 1:
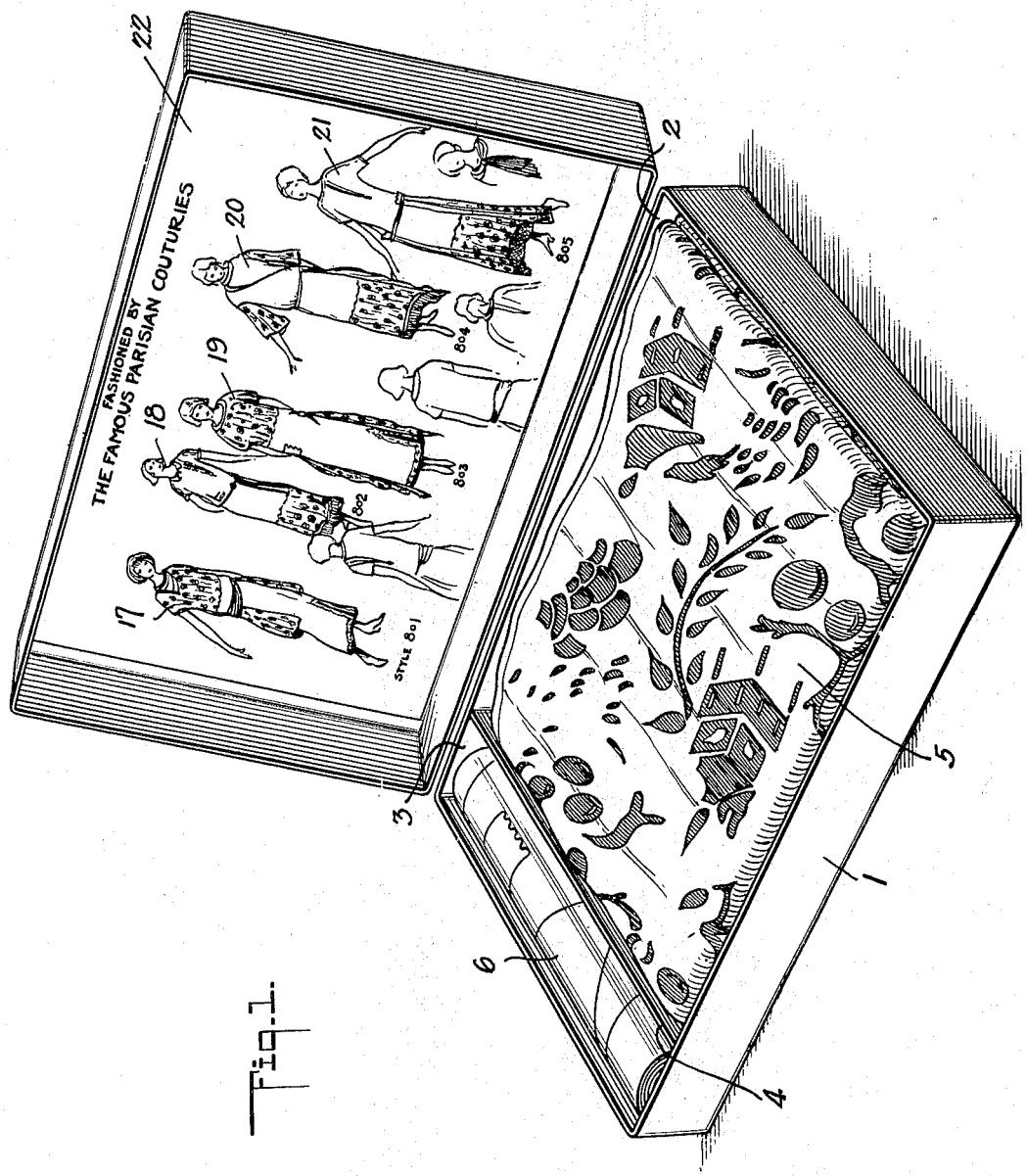
Figure 1 is a perspective view of a complete chart outfit, disclosing an embodiment of the invention.

According to the resent method of making dresses in the home or by more or less inexperienced persons, the desired pattern is first selected. In the process of selecting the pattern, pictures of different dresses are considered and when the desired style is secured from a given picture, a pattern is purchased which agrees with the particular dress in that picture. Along with the pattern is supplied information as to the amount of goods necessary and after this goods has been purchased, the dress is cut according to the pattern and finished in the usual manner. In selecting the goods, the color, quality and other similar things are left entirely to the taste of the purchaser. In the present invention, an educational outfit or chart is provided in which there is presented a box having goods arranged therein sufficient to produce a dress when cut according to the pattern and other information associated with the box.

In the accompanying drawing, 1 indicates a box of any desired kind, as for instance, an ordinary pasteboard box which is divided into compartments 2 and 3 by a division wall 4. In the compartment 2, there is provided a supply of cloth 5 of a given kind, while in the compartment 3 there is arranged a sheet 6 of paper on which are positioned lines presenting patterns. On one side of the sheet 6 there is arranged three patterns 7, 8 and 9 while on the opposite side there is arranged patterns 10 and 11. Each of these patterns is drawn on the sheet so as to be readily distinguished from the other and in order to secure this result the patterns may be outlined by different kinds of perforations or different kinds of marks. At the bottom of the sheet 6 there is arranged blocks or frames 12, 13, 14, 15 and 16, said blocks or frames corresponding in appearance to the different patterns on the sheet and each block containing a number, which number corresponds with the number or legends indicating the various Figures 17, 18, 19, 20 and 21 shown on the plate 22. These figures illustrate the finished dress as it will appear on a person so that anyone may view these figures and select the desired style. If the style 803 is selected, the frame 14 containing the legend 803 will indicate the particular pattern to be cut from the sheet 6.

Preferably, the various patterns 801 to 805 are formed on sheet 6 by lines of different colors. For instance, the pattern 801 may be drawn on the sheet 6 with green ink, pattern 802 with blue ink, pattern 803 with orange ink and so on for all of the patterns on both sides of the sheet. The sheet 6 in the accompanying drawing illustrates only five patterns but it is evident that a greater or less number might be provided and in case a greater or less number was provided, a corresponding change would be made on the plate 22. If the dress illustrated by number 803 on the plate 22 was selected and upon examining the frame 14 it was noticed that this frame was orange, the workman would cut along the orange lines on the sheet 6 and when all these lines were cut a pattern would be produced which could be used in cutting the cloth for making accurately the dress shown on Figure 19 and indicated by legend 803.

In selecting the goods 5 and the various dresses illustrated on the plate 22, the appearance of the finished dress is taken into account and, consequently, only goods which are suitable for the dresses shown on chart 22 is placed in the compartment 2. If different styles of dresses to those illustrated in the accompanying drawing were placed on the plate 22, a different kind of goods would be placed in compartment 2, said goods corresponding in a certain sense to the styles presented on the plate 22.

It will be noted that when one pattern has been cut from sheet 6, said sheet is completely destroyed so that the other patterns are worthless. This is not a hardship as another pattern sheet 6 is supplied with the next outfit which consists of a box and lid and other parts as shown in Figure 1. A new outfit would contain goods 5 which will make up into dresses that will appear nice if constructed according to the pattern in compartment 3 of that particular box. For instance, if the dresses on plate 22 show winter garments, the patterns on sheet 6 will correspond thereto and the goods 5 will also be of a proper kind for this style of garment. If the dresses on chart 22 are like evening dresses, the material 5 will correspond thereto and so on for different styles and conditions. By arranging the cloth 5 to correspond with the style presented on plate 22, the purchaser does not have to be careful to buy goods and patterns which correspond as far as style and use are concerned as these matters have already been taken care of. The instructions are arranged on the space 23 on the sheet 6 and the various lines indicating the patterns are provided with conventional indications for the allowance of seams and other incidental matters in connection with cutting the cloth 5.

What I claim is:—

1. A dressmaking outfit, comprising a container formed with a bottom section and a lid, means for dividing the bottom section into compartments, one of said compartments being adapted to receive a quantity of cloth, a sheet containing a plurality of patterns indicated thereon arranged in the other of said compartments, a plate illustrating finished dresses arranged in said lid, and legends arranged adjacent said illustrated dresses and adjacent the respective patterns on said pattern sheet whereby the corresponding pattern may be readily selected.

2. A dressmaking outfit, comprising a plate having a number of different dresses illustrated thereon, a legend arranged opposite each dress and a pattern sheet formed with a plurality of indications thereon, each indication outlining a different pattern, and legends arranged adjacent each indication, said last mentioned legends corresponding with the first mentioned legends whereby a pattern corresponding to the dresses on said plate may be cut from said sheet.

3. A dressmaking outfit, comprising a box having a bottom and a lid, illustrations arranged in said lid illustrating different kinds of dresses, an identifying legend arranged adjacent each of the illustrations and a sheet arranged in the bottom of said box formed with a plurality of patterns drawn on each face thereof, and an identifying legend associated with each of the drawn patterns, said last mentioned identifying legends corresponding to the identifying legends adjacent the illustrations.

4. An educational chart for guiding an inexperienced person in making a dress, comprising a fashion plate provided with a plurality of different dresses illustrated thereon, an identifying legend arranged adjacent each of said illustrated dresses and a pattern sheet co-acting with said plate and formed with a plurality of lines thereon representing different patterns, each set of lines representing a pattern for one of the dresses illustrated on said plate, and an identifying legend for each set of lines corresponding to the identifying legends on said plate.

LOUIS KATZMAN.